United States Patent [19]

Gerpheide et al.

[11] Patent Number: 5,340,108
[45] Date of Patent: Aug. 23, 1994

[54] APPARATUS FOR PROJECTING AND MOVING A SPOT OF LIGHT IN A SCENE PROJECTED ON A SCREEN AND FOR CONTROLLING OPERATION OF A STEPPER MOTOR USED THEREWITH

[75] Inventors: George E. Gerpheide, Salt Lake City, Utah; Donald A. Wilson, 7638 Mary Esther Cir., Salt Lake City, Utah 84093; Sidney L. King, Salt Lake City, Utah

[73] Assignee: Donald A. Wilson, Salt Lake City, Utah

[21] Appl. No.: 797,420

[22] Filed: Nov. 22, 1991

[51] Int. Cl.$^5$ .............................................. A63B 69/36
[52] U.S. Cl. ............................... 273/185 A; 273/185 B; 273/358
[58] Field of Search ................ 273/185 A, 185 B, 358; 353/30, 11, 34, 35, 42, 46, 50, 51, 25

[56] References Cited

U.S. PATENT DOCUMENTS

| | | | |
|---|---|---|---|
| 2,783,999 | 3/1957 | Simjian | 273/185 B |
| 3,300,218 | 1/1967 | Speiser | 273/185 A |
| 3,469,905 | 9/1969 | Baldwin et al. | 273/185 A |
| 3,501,152 | 3/1970 | Conklin et al. | 273/185 B |
| 3,513,707 | 4/1970 | Russell et al. | 273/185 B |
| 3,528,733 | 9/1970 | Pratt et al. | 353/25 |
| 3,589,732 | 6/1971 | Russell et al. | 273/185 B |
| 4,086,630 | 4/1978 | Speiser et al. | 273/185 B |
| 4,150,825 | 4/1979 | Wilson et al. | 273/185 B |
| 4,160,942 | 7/1979 | Lynch et al. | 273/185 A |
| 4,168,115 | 9/1979 | Russell et al. | 273/185 B |
| 4,437,672 | 3/1984 | Armantrout et al. | 273/185 B |

Primary Examiner—Jessica J. Harrison
Attorney, Agent, or Firm—Mallinckrodt & Mallinckrodt

[57] ABSTRACT

Apparatus for projecting selected images of a scene onto a screen, such as images of a golf course looking toward a green, and for projecting and moving a spot of light on the screen superimposed on the scene, such as to represent the travel of a hit golf ball toward the green in the scene, provides both a scene projector and a light spot projector secured in fixed relationship in the same housing and provides dedicated control circuitry for controlling the apparatus in response to instruction signals received from outside the apparatus. The spot projector includes two rotatable mirrors controlled by two stepper motors to control the movement of the spot on the screen. Special circuitry is provided to generate control signal pulses for the stepper motors using a combination of a count signal pulse and a synchronizing pulse. Compensation for nonlinearities in the stepper motors may be provided by reference to a correlation table stored in memory. The scene projector may be provided with automatic focus control using a modulated light beam and stepper motor position control.

18 Claims, 9 Drawing Sheets

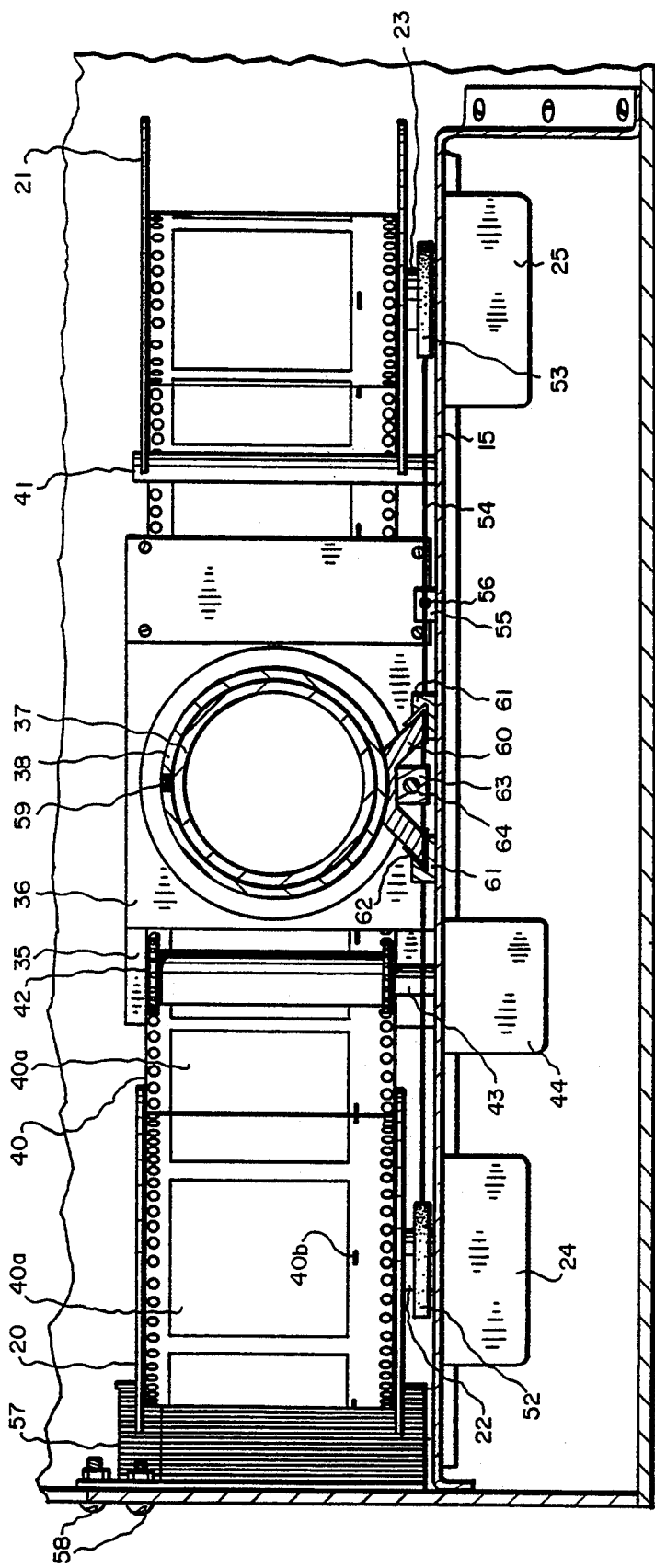
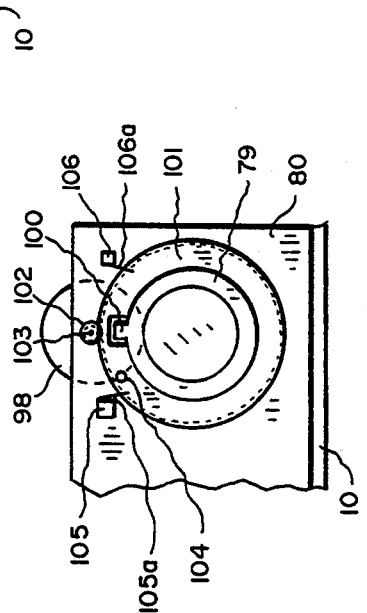
FIG. 4
FIG. 8

APPARATUS FOR PROJECTING AND MOVING A SPOT OF LIGHT IN A SCENE PROJECTED ON A SCREEN AND FOR CONTROLLING OPERATION OF A STEPPER MOTOR USED THEREWITH

BACKGROUND OF THE INVENTION

Field

The invention is in the field of projection equipment for controlling the projection of an image in a sports simulation game and for projecting a spot of light superimposed on the image which simulates the travel of an object through the image such as the travel of a golf ball in an image of a golf course projected on a screen.

State of the Art

Various arrangements are used for simulating the playing of a game of golf in small areas, such as indoors, to provide opportunities for people to play who might not otherwise be able to play because of crowded golf course conditions or because of bad weather. In addition, such golf simulators can simulate play on various famous golf courses not otherwise accessible to the players.

Most golf simulation equipment includes at least three components: a central control unit which keeps track of play and calculates ball travel and lie, a sensor unit which senses how a ball is hit to enable the control unit to calculate the trajectory and resulting lie of the hit ball, and a projection unit for projecting an image showing the green to which the ball is to be hit from the location of the ball. Because the equipment senses how a ball is hit and the distance and direction of travel of the ball, such equipment could also be adapted to simulate various other sport games, such as baseball or soccer, or at least various practice aspects thereof.

U.S. Pat. Nos. 4,150,825 and 4,437,672 show a type of golf simulation game. In the game of the patents, one to four players initially enter information into the control unit regarding the players and the men's, women's, or championship tees from which each will play, and the particular course and holes to be played, e.g., the front nine, back nine, etc. The control unit then operates a display to show who is to tee off and operates a projector to project an image on a screen in front of the players showing the view toward the green from the tee. The designated player hits his or her ball from the tee toward the green as he or she would on a regular golf course, the ball flying toward and hitting the screen which is specially designed for that purpose and is usually located about twenty feet in front of the player. Special sensors in the form of photosensor arrays are arranged to detect passage of the ball through three separate sensing planes, the third plane being positioned with respect to the screen so as to sense the ball's movement toward the screen and also the ball's rebound from the screen. With the information from the sensors, the ball's trajectory can be calculated and the position at which the ball lands along the fairway can be determined relatively accurately. The control unit keeps track of each player's ball and the position at which it landed. After all players have teed off, the control unit determines which player's ball is farthest from the hole and causes operation of the projector to move to and project an image on the screen showing the view from the position of the farthest ball looking toward the green. The player again hits his or her ball toward the green shown on the screen and again the trajectory of the ball is calculated and the new position along the fairway determined. The control unit then again determines the farthest ball from the hole, displays the name of the player, and instructs the projector to provide the new appropriate image. The identified player then hits his or her ball. Play is continued in this manner until all players reach the green. At that time, a simulated green is lighted and the players actually putt the ball into a hole in the simulated green.

In order to fully simulate the game, it is necessary to provide a representation of the ball traveling down the fairway toward the green so that players can watch the ball as it travels as they would do in a real game. Thus, ball projecting apparatus in the form of light spot projectors which project a small spot of light onto the screen to simulate the hit ball have been added to the equipment shown in the referenced patents. The light spot projector used with such equipment is aligned with the projector projecting the image of the golf course and moves the light spot to correspond with the calculated trajectory of the travel of the ball.

The prior art light spot projector utilizes two mirrors, each controlled by a separate stepper motor to provide the vertical and horizontal deflections, respectively, of a light spot on the screen. However, since the light spot projector is located near the image projector, both about twenty feet from the screen, very small movements of the mirrors projecting the light spot cause large movements of the light spot. Further, uneven movements or stepping of the mirrors causes unrealistic, uneven jumping of the light spot. The prior art projectors used mechanical stops to determine the home reference or starting positions of the mirrors, which, because of the characteristics of the stepper motors and their step controls, were not accurate in providing the same starting position from unit to unit and were very difficult to adjust.

While the light spot projectors add greatly to the simulation of a game, improvements in the control of the light spot to provide a smooth, accurate movement representative of the trajectory of the ball are desirable.

SUMMARY OF THE INVENTION

According to the invention, stepper motors controlling mirrors which project a light spot on a screen are controlled by utilizing varying width control pulses to move smoothly and controllably between steps to break down each step of a stepper motor into a large number of smaller micro-steps so that movement of the motors and mirrors attached thereto are smoothly and accurately controlled to provide a smooth trajectory for the projected light spot. The control signals for the motors are generated using a clock pulse, a synchronizing pulse, a counter to count a preset number of clock pulses, and logic or combining circuitry to combine the synchronizing pulses and the signal from the counter. The logic and counter are controlled by control circuitry, generally including a microprocessor. Electrical stop means are provided to accurately determine a home or starting position for the mirrors and the light spot projection means is preferably housed with and held in fixed relation to the image projection means so that the two always remain properly aligned. The image projection means may include an automatic focus feature. Further, the dedicated control circuitry of the apparatus runs the image and light spot projectors to provide improved control and allow communication through a standardized communication protocol with other parts of a larger sports simulation system.

Because stepper motors are nonlinear when operated using the micro-step control described, the control circuitry also preferably includes a table of control signals versus stepper motor positions so the control circuitry can "look up" the control signals to use to position the stepper motors and mirrors at any desired position. This provides accurate and repeatable positioning of the light spot on the screen. The invention also includes the method of providing accurate positioning of a stepper motor by use of a table showing control signals versus stepper motor positions.

DRAWINGS

The best mode presently contemplated for carrying out the invention in actual practice is illustrated in the accompanying drawings, in which:

FIG. 1 is a top plan view of a projection unit of the invention;

FIG. 2, a vertical section taken on the line 2—2 of FIG. 1;

FIG. 3, a fragmentary vertical section taken on the line 3—3 of FIG. 1;

FIG. 4, a fragmentary vertical section taken on the line 4—4 of FIG. 2 indicating that the section is taken at an angle and on the line 4—4 of FIG. 1 indicating the general orientation of FIG. 4;

FIG. 5, a fragmentary vertical section taken on the line 5—5 of FIG. 1;

FIG. 6, a fragmentary vertical section taken on the line 6—6 of FIG. 1;

FIG. 7, a fragmentary longitudinal section taken on the line 7—7 of FIG. 2 but showing the lens in elevation;

FIG. 8, a fragmentary vertical section taken on the line 8—8 of FIG. 1 showing the iris assembly;

FIG. 9, a block diagram of control circuitry suitable for use with the invention;

FIG. 10, a schematic showing of stepper motor energization pulses;

FIG. 11, a more detailed block diagram of a stepper motor controller block of FIG. 9;

FIG. 12, a block diagram of the circuitry of an automatic focus system usable with the invention;

FIG. 13, a fragmentary vertical section somewhat similar to FIG. 5 but showing the lens holder in elevation and showing a different embodiment for mounting and moving the lens holder; and FIG. 14, a fragmentary horizontal section taken on the line 14—14 of FIG. 13.

DETAILED DESCRIPTION OF THE ILLUSTRATED EMBODIMENT

Figure 1:
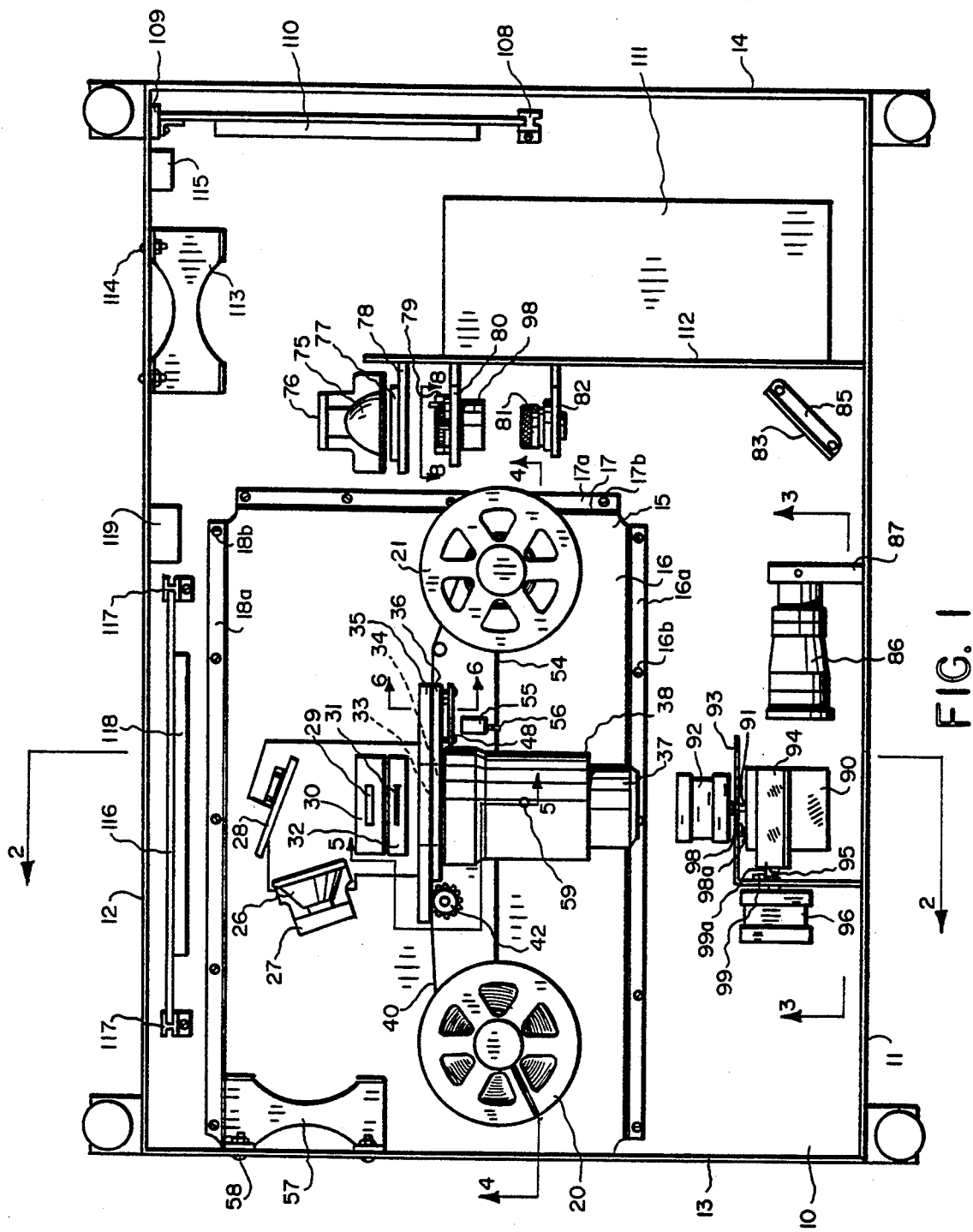

As shown in FIGS. 1 through 4, the projection unit of the invention includes a base 10 with front wall 11, back wall 12, and side walls 13 and 14 extending upwardly therefrom, to form an enclosure for the unit. A film platform 15 is mounted at an angle to base 10 by platform front wall 16 and platform side wall 17, FIGS. 1, 2 and 3. A flange 16a extends against base 10 along the bottom of platform front wall 16 and is secured to base 10 by screws 16b. Similarly, a flange 17a extends against base 10 along the bottom of platform side wall 17 and is secured to base 10 by screws 17b. A flange 15a extends along film platform 15 where it abuts side wall 13, and is secured to side wall 13 by screws 15b. A rear flange 18a extends from the rear edge of a film platform 15 and is secured to base 10 by screws 18b. In this manner, film platform 15 is mounted securely in the enclosure.

Figure 2:
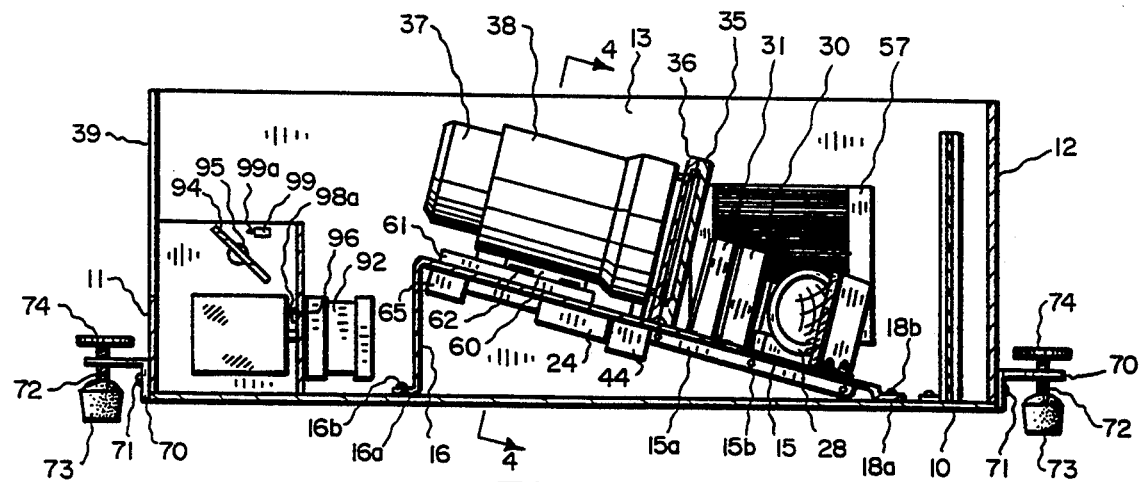
Figure 3:
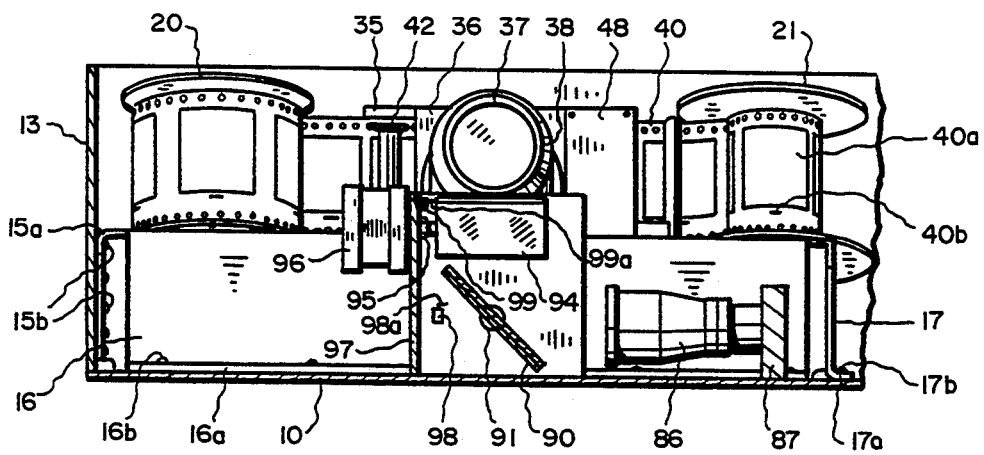

Film reels 20 and 21, FIGS. 1, 3, and 4, are mounted on shafts 22 and 23 extending from torque motors 24 and 25 mounted beneath film platform 15 and secured thereto, FIG. 4. A projection lamp 26 mounted in holder 27 on film platform 15 directs a beam of light to mirror 28 from which it is reflected through infrared filter 29 in filter holder 30 to block out heat from the light beam, lens 31 in lens holder 32, openings 33 and 34 FIGS. 1 and 7, in film guide halves 35 and 36, respectively, and lens 37 in lens holder 38. From lens 37, the light passes through opening 39, FIG. 2, in front wall 11 to a screen or other reflective surface, not shown.

Figure 5:
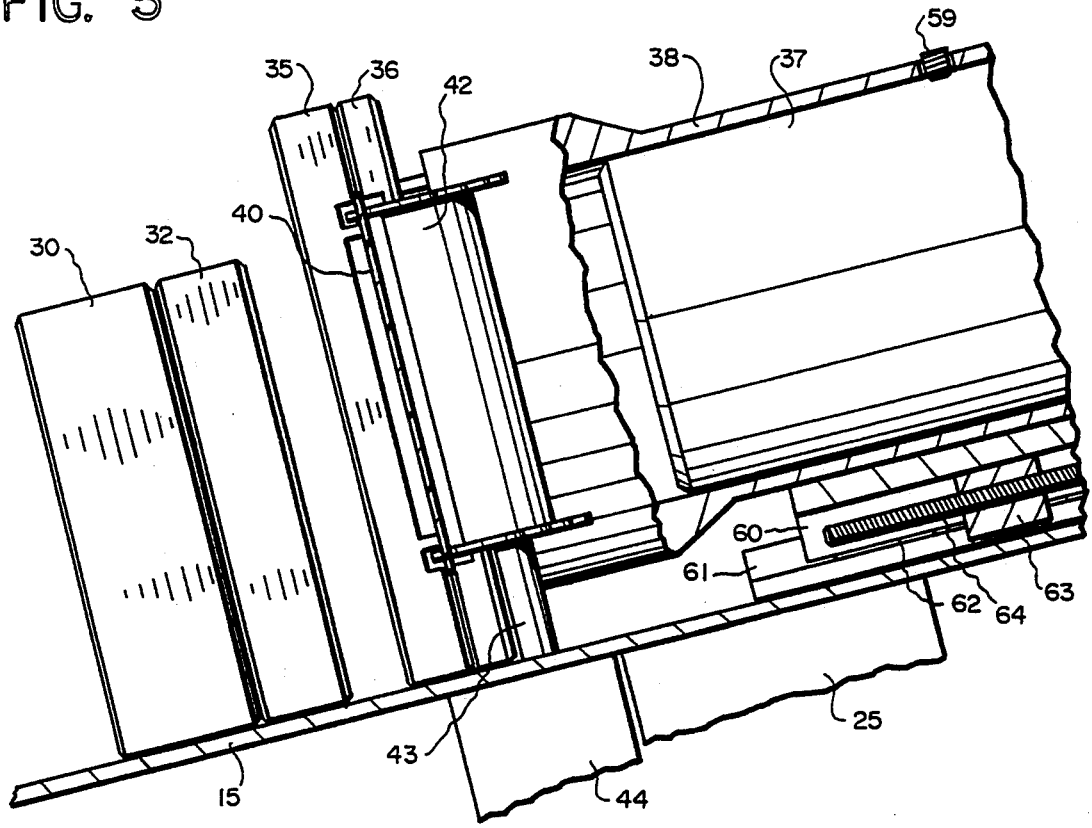
Figures 6, 7:
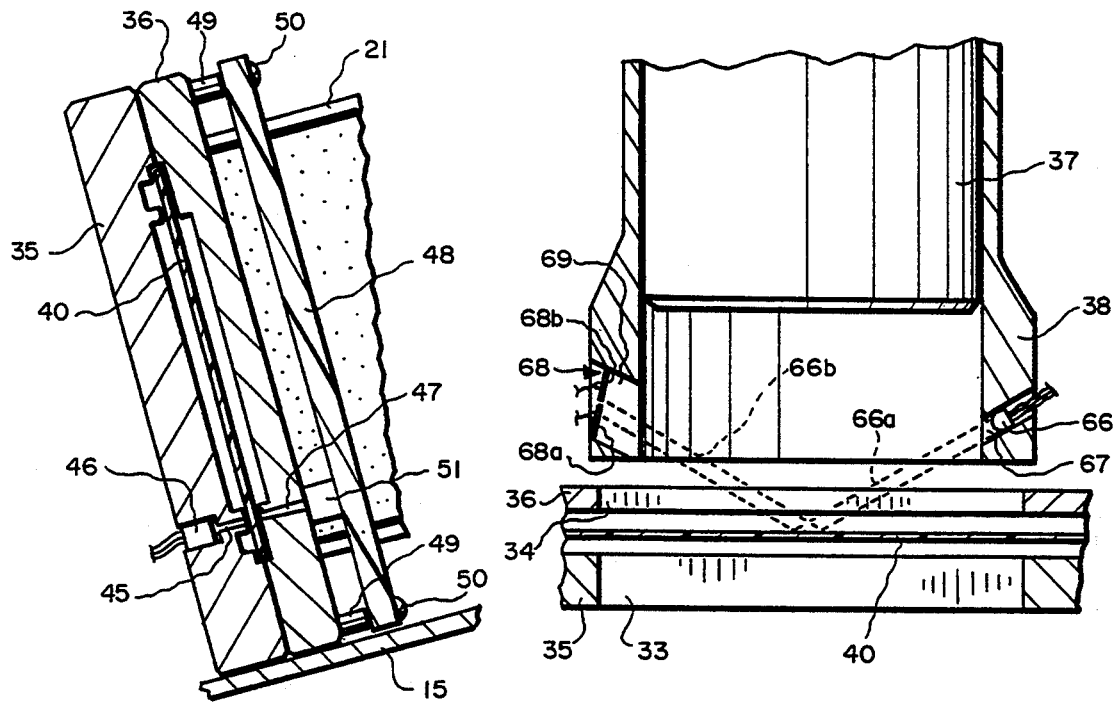

Film 40 extends between film reels 20 and 21 and passes over guide roller 41 through film guide halves 35 and 36 and around film drive sprocket 42. Film drive sprocket 42 engages film 40 in film guide half 35, FIGS. 1, 4, and 5, and is connected through shaft 43 to a film drive stepper motor 44 mounted beneath film platform 15. The drive sprocket 42, driven by stepper motor 43, causes the film to move back and forth within film guide halves 35 and 36 between film reels 20 and 21 in order to position selected images on the film in film guide openings 33 and 34 so the light beam can pass therethrough to project such images on the screen. Stepper motor 44 is controlled by control electronics to move the film to project the desired image. Particular images 40a on the film may be detected and identified in various ways, such as by a separate detector light beam and identification markings or spots 40b on the film and associated with each frame which interrupt the detection light beam as described in referenced U.S. Pat. No. 4,437,672. As shown in FIG. 6, a small bore 45 extends through film guide half 35 and has a light emitting diode (LED) 46 mounted therein to direct light from the LED toward film 40. A bore 47, aligned with bore 45, extends through film guide half 36. The film spot detecting circuitry is located on printed circuit board 48 mounted to film guide half 36 by standoffs 49 and screws 50. A light detector 51 is mounted on circuit board 48 and positioned so that its light detecting surface is adjacent the open end of bore 47 when circuit board 48 is properly mounted. In this way, detector 51 can receive and detect light passing through bore 47. With LED 46 illuminated, if the film between bores 45 and 47 is transparent, light travels from LED 46, through bore 45, film 40, and bore 47, to detector 51. If an opaque spot occurs on the film between the bores, the light is blocked by the spot and no light reaches the detector 51. The detector circuitry can be set to produce pulses corresponding to the spots on the film as the film moves through the film guide. In this way, the circuitry can count the pulses from a known starting point and along with keeping track of the direction of film movement each time the film is moved, identify the position of the film and the particular image being projected. Other detector circuit components would be located on circuit board 48, but are not shown here. The detector circuitry will generally just condition the pulses so they can be transmitted to the control circuitry where they will be counted, or transmitted to a control computer for counting.

Torque motors 24 and 25 keep the film 40 taut between reels 20 and 21 as it is moved by sprocket 42 from one reel to the other and at all times when power is supplied to the unit. The torque motors may have internal brakes to prevent rotation of the film reels and unwinding of the film when the projector unit is not in operation, i.e., power is not supplied to the unit. However, most torque motors currently available do not provide such brakes. In order to avoid unwinding of the reels when power is off, a spring may be provided extending about and between shafts 22 and 23 to provide friction on the shafts and resist unwinding of the film when the unit is not in operation. In a preferred form of the invention, a collar 52, FIG. 4, is provided loosely about shaft 22 extending from torque motor 24 and a collar 53 is provided loosely about shaft 23 extending from torque motor 25. The collars 52 and 53 are connected by a cable 54. A solenoid 55, FIG. 1, is connected to cable 54. When power is provided to the unit and to solenoid 55, the plunger 56 of the solenoid extends from the housing 55 and cable 54 is loosened to allow collars 52 and 53 to loosely surround shafts 22 and 23 and allow them to freely rotate under control of torque motors 24 and 25, respectively, and allow movement of the film. When power is shut off, plunger 56 retracts into the solenoid housing 55 which pulls cable 54 to pull collars 52 and 53 against shafts 22 and 23. This tightening of the collars against the shafts produce friction resisting rotation of the shafts. Rather than the collars being connected by cable 56, separate cables and solenoids may be provided for each shaft.

A cooling fan 57, mounted on base 10 by bolts 58 circulates cooling air around projector bulb 26.

It may be desirable to provide automatic focusing for the projection unit. The image is focused onto the screen by moving focusing lens 37 with respect to the film in the opening in the film holder. The focus of a projected image is determined by the distance between the film 40 and lens 37. For automatic focusing, movement of lens 37 is controlled by a motor which may be positioned to cause such movement in a well known manner. Operation of the motor may be controlled in any manner as currently used for automatic focusing adjustment in projectors. For example, lens 37 may be secured to lens holder 38 by a set screw 59, FIG. 4, and lens holder 38 may be mounted on bracket 60 for sliding movement in track 61. Plastic bearings 62 are positioned along the track to reduce sliding friction. An arm 63 secured to bracket 60 extends between track 61 to receive a threaded shaft 64 therethrough. Shaft 64 is coupled to a motor 65, FIG. 2, and rotation of threaded shaft 64 causes longitudinal movement of arm 63, bracket 60, and lens holder 38 with lens 37 therein along the track.

The need for an automatic focusing unit arises because as the film in the light beam of a projector heats up, it can move, thereby changing the distance between it and the lens, and moving it out of focus. Thus, it is necessary to sense any movement of the film and then cause movement of the lens 37, or the lens 37 and lens holder 38 together, to compensate for movement of the film. A light emitter such as an LED 66, FIG. 7, may be mounted in a bore 67 in lens holder 38 to direct a probe beam of light 66a at an angle against the film 40 in the opening 34 in film guide half 36. This is the portion of the film 40 in the projection light beam. The probe beam is reflected from the film as beam 66b to a light detector 68 in bore 69 of lens holder 38. The position of the reflected light beam 66b is determined by the position of the film. As the film moves, the position of the beam reflected from the film onto the detector changes. Detector 68 is preferably a two element differential detector such as two square photodiodes 68a and 68b placed side-by-side which can detect movement of the reflected beam. The movement of the reflected beam is proportional to movement of the film. The control circuitry evaluates the signal from the detector proportional to film movement and causes movement of lens holder 38 with lens 37 therein through rotation of shaft 64 to compensate for film movement and keep the distance between film and lens constant.

Figure 12:
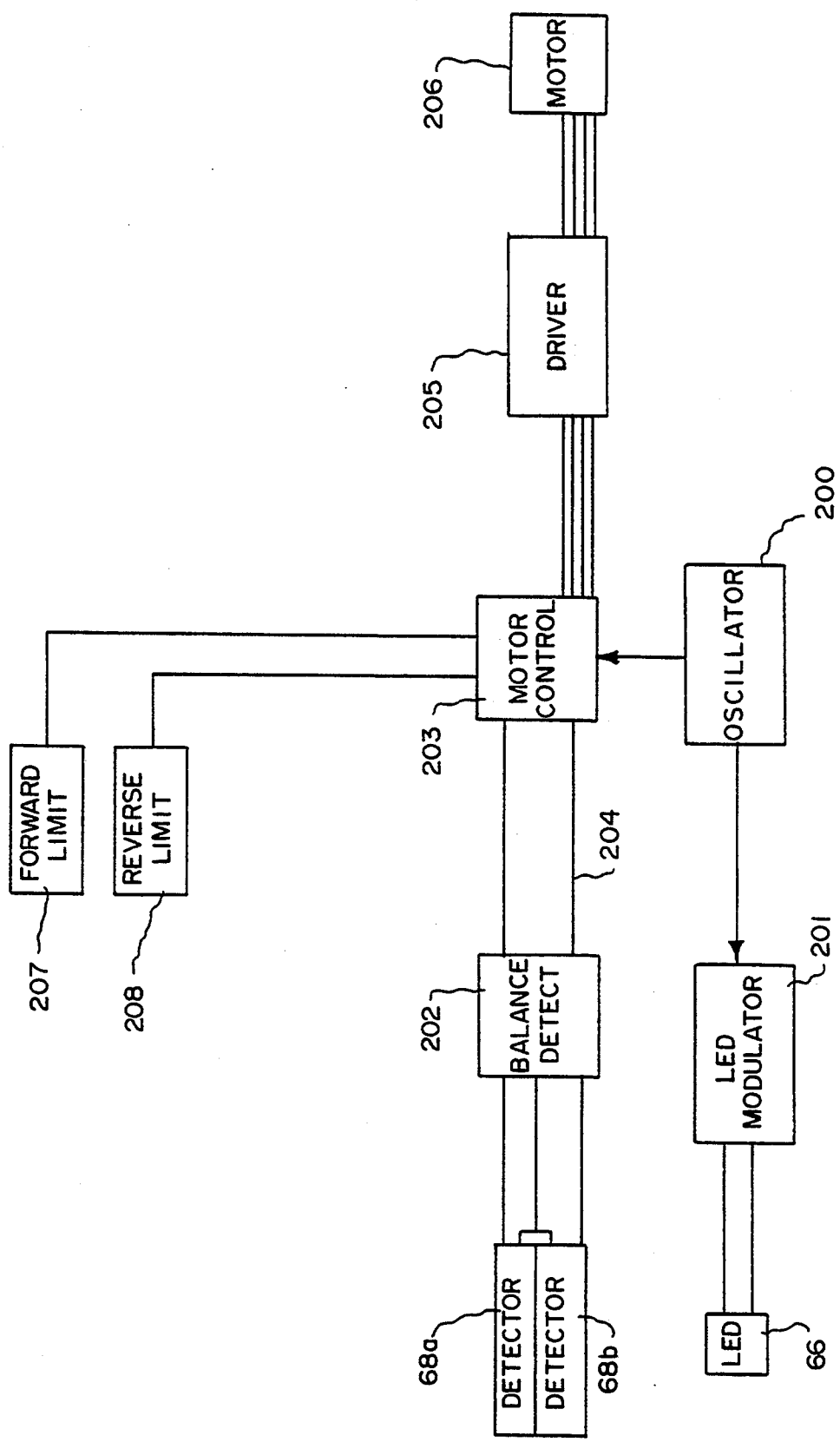

FIG. 12 shows automatic focus circuitry usable with the invention. The circuit is set to move the lens holder to a position where the reflected probe beam falls equally on detectors 68a and 68b. Upon initial installation of the projection unit, the lens holder would move to its "in-focus" position where the reflected light beam falls equally on both detectors 68a and 68b. Set screw 59, FIG. 5, is loosened and lens 37 moved in lens holder 38 until the image is focused on the screen. The set screw 59 is tightened to hold the lens in this focused position. This establishes the "in-focus" distance between the lens 37 and film 40.

Figure 14:
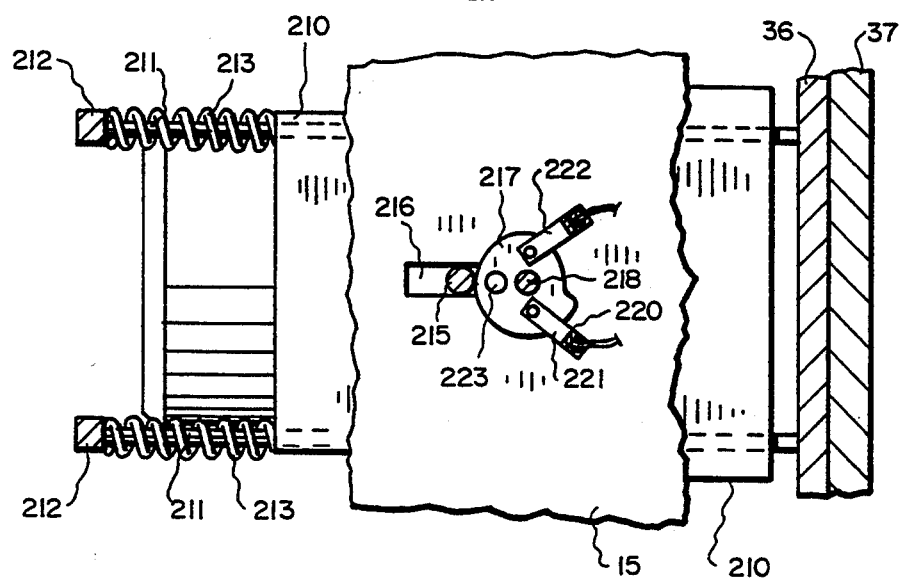

The particular circuitry illustrated in FIG. 14 uses a modulated, infrared probe light beam. This has been found to minimize the interference and noise in the detection circuitry that may result from ambient light in the environment of use of the equipment. Thus, an oscillator 200 provides a signal of the desired modulation frequency. A frequency of 700 Hz has been found satisfactory. The signal from the oscillator is connected to the LED Modulator 201 which provides a modulated power signal to LED 66. This causes LED 66 to produce a probe light beam 66a, FIG. 5, of infrared light modulated at 700 Hz frequency. The reflected light beam 66b falls onto detectors 68a and 68b. When in focus, the reflected beam falls equally on detectors 68a and 68b. This sends equal output signals to balance detect circuitry 202. With the signal from each detector the same, no output is sent from the balance detector 202 to motor control circuitry 203. If the film moves backward in the film holder causing the reflected light beam 66b to fall more on detector 68a than on 68b, the balance detect circuitry 202 will receive a greater output signal from detector 68a than from detector 68b. The balance detect circuitry will provide an output on the reverse line 204 to the motor control circuitry 203 which then operates the motor driver 205 to operate motor 206 to cause the lens holder and attached lens to move rearwardly toward the film until the light beam again falls equally on both detector 68a and 68b. Similarly, if the film moves forwardly, the reflected light beam will fall more on detector 68b than 68a. In this instance, the balance detect circuitry 202 sends a forward signal on line 205 to motor control circuitry 203 which operates motor driver 205 to cause the motor 206 to move the lens holder and lens away from the film until the proper distance is reached as indicated by balanced output of detectors 68a and 68b.

It is possible with an automatic focusing system that if the probe beam hits a defect or crease in the film, the reflected beam will be positioned so far to one side or the other that the system cannot properly focus the film. It is advantageous to provide limit switches to signal the motor control circuitry when the lens holder has moved as far as desirable in one or the other directions so as to avoid damage to the apparatus in case of extreme movement of the reflected beam. Thus, a forward limit switch 207 and reverse limit switch 208 are connected to motor control circuitry 203 and provide signals if operation of the motor causes movement of the lens holder to a forward or reverse limit of travel, respectively. With limit switches provided, the circuitry can be set to stop the motor at either end of its travel when a limit switch is activated until the condition on the light detector changes because of further movement of the film. The oscillator 200 is connected to the motor control circuitry 203 for use in demodulating the signal from the balance detect circuitry 202. Alternately, the oscillator 200 could be connected to the balance detect circuitry and the signals from the detector demodulated there. The circuitry of FIG. 12 for the automatic focus can be located as desired in the housing but may conveniently be included on printed circuit board 48 which also includes the film spot detector.

Figure 13:
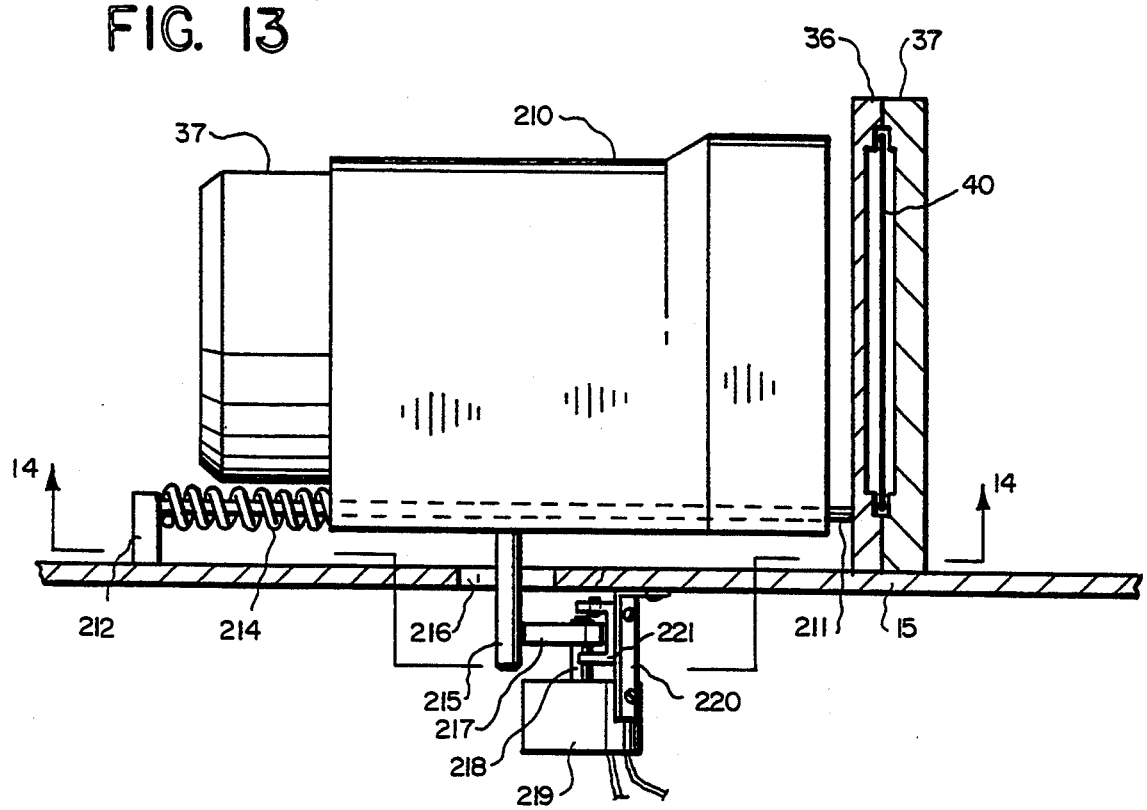

FIGS. 13 and 14 show a second embodiment of lens and motor mounting for the automatic focus control. Lens 37 is mounted in lens holder 210 having a bottom portion configured to slidingly receive and ride the rails in the form of rods 211 which extend between forward film guide half 36 and brackets 212 secured to film platform 15. Springs 213 are positioned around rods 211 between brackets 212 and lens holder 210 and bias lens holder 210 along rods 211 toward forward film guide half 36.

A pin 215, acting as a cam follower, extends from lens holder 210 through slot 216 in film platform 15 and is biased by springs 214 against the caming surface of cam 217. Cam 217 is mounted for rotation with shaft 218 extending from stepper motor 219 secured beneath film platform 15 by brackets 220. Limit switches 221 and 222 in the form of optical interrupters, i.e., a light source and light detector mounted in a U-shaped package so that the cam 217 extends therebetween and blocks the light beam except when a limit is reached indicated by cam opening 223 which allows a path for travel of light through the cam, are mounted on brackets 222.

In operation, stepper motor 219 is operated to rotate cam 217. Pin 215 riding on cam 217 causes lens holder 210 to move forward away from film holder 36 and against the base of springs 213 when the cam is rotated clockwise in FIG. 14, and allows the lens holder 210 to move rearwardly toward film holder 36 under the bias of springs 213 where cam 217 is rotated in a counterclockwise direction as shown in FIG. 14.

The unit enclosure includes leveling feet, FIGS. 1 and 2, so that the unit can be leveled or the tilt can be adjusted as desired for a particular unit location and screen location. Brackets 70 are screwed to each end of enclosure front wall 11 and enclosure back wall 12 by screws 71. A threaded shaft 72 extends through a thread hole in each bracket 70 and has a rubber foot 73 at one end thereof and an adjusting knob 74 secured to the other end thereof. Thus, by turning adjoining knob 74, the shaft 72 turns and moves longitudinally through bracket 70 and rubber foot 73 is moved up or down in relation to the bracket and the enclosure.

The portion of the projection unit described so far projects images from film 40 onto a screen to provide the views of the golf course being played from the position of the ball toward the green. In addition, the unit also includes means for projecting a spot of light onto the image to represent travel of a ball after being hit. For this purpose, a projector lamp 75, FIG. 1, is mounted in socket 76 secured to base 10. The light produced by projector bulb 75 is directed through diffuser lens 77 in holder 78 secured to base 10, iris assembly 79 in holder 80, and lens assembly 81 in holder 82. The light is then reflected at a right angle by mirror 83 mounted by bracket 85 to base 10 and directed through lens 86 mounted to base 10 by bracket 87, which focuses the light onto lower control mirror 90. Lower control mirror 90 is mounted for rotation on shaft 91 extending from stepper motor 92 secured to wall 93. Rotation of stepper motor 92 is controlled by the control electronics and causes rotation of lower control mirror 90. Movement of lower control mirror 90 controls movement, i.e., changes the direction, of the light beam from lens 86 as it is reflected from the mirror 90, such movement being in the plane perpendicular to the axis of rotation of the mirror. This movement results in controlling and moving the position of the light beam in a horizontal direction on the screen. The light beam is directed from lower control mirror 90 to upper control mirror 94 mounted for rotation with shaft 95 of stepper motor 96 which is secured to wall 97. As shown, the axes of rotation of control mirrors 90 and 96 are arranged perpendicularly. Upper control mirror 94 directs the light beam through opening 39 in front wall 11 and onto the screen upon which the image from film 40 is projected. Thus, the light beam produces a light spot on the screen superimposed on the scene projected thereon as previously described. Rotation of stepper motor 96 is controlled by the control electronics and such rotation causes rotation of mirror 94 which controls movement, i.e., changes the direction, of the light beam reflected from mirror 94 in the plane perpendicular to the axis of rotation of the mirror. This movement of mirror 94 controls movement of the reflected light beam in the vertical direction on the screen. Thus, by controlling rotation of lower control mirror 90 and upper control mirror 94, which control movement of the light beam in two planes representing perpendicular directions of movement on the screen, the light beam from lens 86 can be selectively positioned anywhere on the screen and can be controllably moved to various positions.

It is usually desirable to provide a stop for each mirror so that upon starting the unit or resetting the unit, each mirror will have a reference or starting point. In the prior art, this reference was merely a physical stop which would physically stop the mirror as the mirror hit it at one point during its rotation. This stop established the limit of rotation in one direction and established a reference point. However, with a physical stop, in addition to the physical damage and wear and tear that could occur to the mirror or stop, the reference point was not accurately established because the stepper motor was generally stopped between steps and would start stepping again from a point representing the closest step position. This required a very difficult adjustment of the mirror mounting on the stepper motor shaft to adjust the position of the reference point, and this difficult adjustment had to be made for each motor. With the current invention, a switch 98, such as a micro switch, is positioned on wall 93 with an actuator 98a extending into the path of the mirror. During rotation of the mirror counterclockwise in FIG. 3, the mirror will strike the actuator 98a of switch 98 to electrically signal the control electronics that the mirror has reached the limit of its travel in the counterclockwise direction. With the electrical indication, the control electronics accurately knows the position of the mirror and such position is repeatedly and accurately obtained each time the mirror is rotated to its stop or reference position. Further, the reference position may be easily adjusted by merely adjusting the position of switch 98, such as by providing grooves for mounting bolts so the switch can be adjustably positioned along the mounting grooves, by providing other special adjustable mounting means for the switch, or by merely bending the switch actuator 98a to adjust the position of the mirror at the time of actuation of the switch.

Similarly, a switch 99 is mounted on wall 97 with an actuator 99a extending into the path of mirror 94. Upon clockwise rotation of mirror 94 as indicated in FIG. 2, mirror 94 will strike actuator 99a to activate switch 99 and electrically indicate to the control electronics that mirror 94 has reached its limit or reference position. Again, since this position is electrically indicated, it is accurately indicated to the control electronics, and is easily adjustable.

Since the projection unit will usually be about fifteen feet or more from the screen, very little movement of either mirror results in a large movement of the light beam, which shows as a light spot representing the ball on the screen. At about fifteen feet from the screen, rotation of mirror 90 through about eighteen degrees will move the light spot horizontally across the entire screen, and rotation of mirror 94 through about eleven degrees will move the light spot vertically entirely across the screen. Movement of the light spot is usually controlled to provide a representation of the trajectory of the hit ball as seen from the position of the hit. Thus, the ball will move upwardly in the image and then downwardly to land on the course and will move horizontally depending upon the direction of the hit and upon the degree of slice or hook imparted to the ball by the hit. The ball may also bounce after hitting the fairway or green. The vertical movement, as explained, is controlled by upper control mirror 94 while the horizontal movement is controlled by lower control mirror 90. Because so little movement of the mirrors will cause such a large degree of movement of the light spot on the screen, it is important to be able to control movement of the mirrors in a smooth manner so movement of the light spot is smooth and appears continuous, rather than appearing to move in steps. In prior art equipment, the movement of the mirror could not be controlled finely enough to provide accurate movement of the ball spot on the screen. The placement of the ball on the screen in response to the same control signals was not accurately repeatable. Further, the positioning was not repeatable from unit to unit. In addition, in the prior art, the ball projection unit was separate from the image projection unit so both units had to be carefully positioned with respect to one another to properly align the ball spot in the projected golf course image. On occasion, the units would come out of alignment and have to be realigned. With the two projection units together in the same housing as in the present invention, the relative position and alignment can be factory set.

The size of the light spot on the screen is controlled by iris 79, FIG. 1, which is operated by stepper motor 98 also mounted on holder 80, and controlled by the control electronics. With the size control, the spot representing the ball is made smaller as the ball travels away from the player toward the green. Lamp 75 may be turned off when no spot is to appear, such as before the ball is hit or after it lands. As with the control mirror, it is important to be able to establish a reference position for the iris so that the control electronics can start from a reference or limit position and keep track of the position of the iris. For this purpose, limit switches are again provided. Referring to FIG. 8, the front of the normal iris 79 includes a handle 100 normally used to manually rotate the iris to cause it to open or close. In the present embodiment, a plastic gear 101 is formed to fit over the front of the iris as shown with an opening 102 receiving handle 100 therein. A gear 102 is mounted on shaft 103 extending from stepper motor 98 and meshed with gear 101. A pin 104 is mounted on gear 101 so as to extend therefrom and actuate either switch 105 through actuator 105a or switch 106 through actuator 106a when rotated to a desired limit in either direction.

The control electronics for the projection unit may be mounted on a printed circuit board 107 mounted between guide 108 secured to base 10 and bracket 109 secured to rear wall 12. Circuit board 107 plugs into receiving socket 110. A power supply 111 may be mounted on base 10 adjacent a dividing wall 112, and a fan 113 mounted by bolts 114 to rear wall 12 provides cooling air to both the power supply 111 and ball spot projector lamp 75. A plug 115 may be provided in rear wall 12 to receive a cable, not shown, from the main game apparatus control unit for communication between the projection unit control circuitry and the main game apparatus control unit. Power distribution circuitry is provided on a printed circuit board 116 mounted between guides 117 secured to base 10 to plug into receiving socket 118. A plug 119 adapted to receive a power supply cord, not shown, may be provided in rear wall 12 to be connected to a source of power. The various wires interconnecting the power supply, power distribution board, fans, projector lamps, control electronics, and torque and stepper motors are not shown, but will be arranged as necessary and obvious in the enclosure.

The control of stepper motors 92 and 96 controlling rotation of lower control mirror 90 and upper control mirror 94 is critical to the realistic effect to be created by projecting a ball spot onto the golf course image. Stepper motors are so named because such motors rotate in steps with the steps being controlled by the signals supplied to the motors. However, in order to provide smooth movement of the light spot, the steps must be so small that the individual steps cannot be detected by the person watching the light spot. The smallest step angles provided by currently readily and economically available stepper motors are 1.8 degrees. Because a movement of only eighteen degrees will move the spot across the entire screen, a step of 1.8 degrees will move the spot across about one tenth of the screen so is still too large to provide the desired small step angles to control the mirrors. Thus, these 1.8 degree step angles, or larger or smaller step angles depending upon the motors used, must be broken down into many smaller steps to provide the desired smooth motor control. In the current invention, the 1.8 degree motor steps are broken down into much smaller steps electronically.

Figure 9:
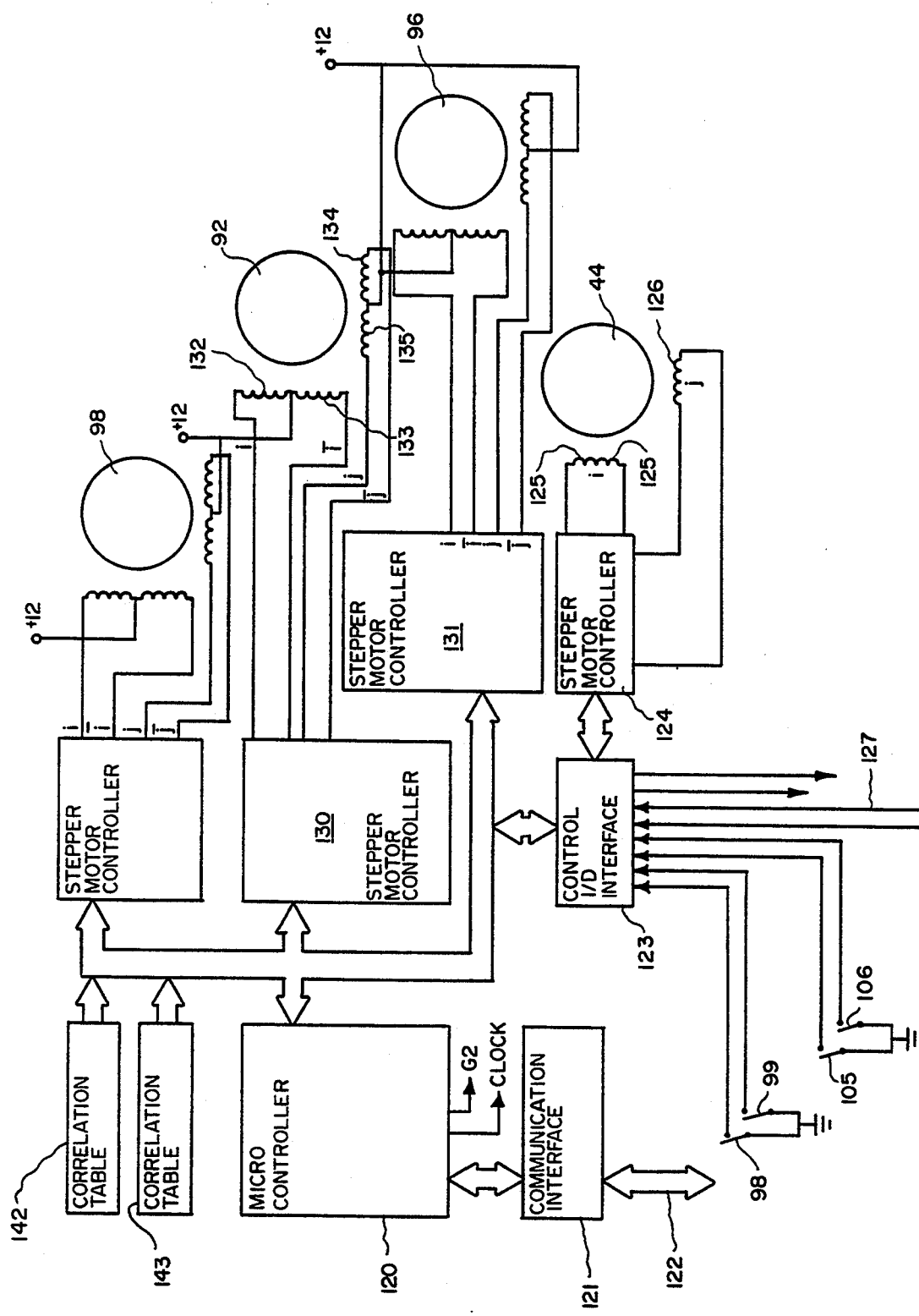

A block diagram of the control electronics for the projector unit is shown in FIG. 9. The overall control of the unit is performed by a control circuit which preferably takes the form of a microprocessor or microcontroller 120 such as an Intel 8031, which includes a microprocessor. Microcontroller 120 may be wired directly to the main game apparatus control unit, or preferably, as described in copending application Ser. No 797,421 filed concurrently herewith, is connected through communication interface circuitry 121 to a standard communication line 122 connected to the main game apparatus control unit and to other game components such as the ball sensing unit. Physically, this connection is through plug 115 in the particular embodiment shown in FIG. 1. Micro-controller 120 will receive instructions from the main game apparatus control unit via the communication line such as instructions to project a particular image on the screen and, after a ball is hit and the main game apparatus control unit has calculated the trajectory of the hit ball from information communicated to it from the ball sensing unit, instructions indicating the distance the ball will travel and the hook or slice value to be applied to the ball. The instructions are received by the microcontroller 120 which then directs operation of the appropriate parts of the projection unit and reports back to the main game apparatus control unit to confirm the receipt of the instructions and indicate the status of performance in response to such instructions. A presently preferred method of operation and communication system is described in the referenced copending application.

When the microcontroller 120 receives the instruction to project a specific image on the screen, the microcontroller supplies a signal through a control input/output interface 123 to stepper motor controller 124 which generates and provides driving pulses to the coils 125 and 126 of stepper motor 44. The pulses are provided in standard manner to cause rapid selected rotation of stepper motor 44 which causes movement of film 40 to the selected frame. A Superior Electric SLO-SYN ® model No. MO61-FD08 stepper motor using standard half stepping has been found satisfactory. The electronic microstepping required for the mirror control is not required for the film control.

As indicated in referenced U.S. Pat. No. 4,437,672, each frame of the film 40 may have an opaque spot 40b thereon positioned to interrupt a detector light beam. This provides a count of the frames or images as they move by the detector. The signal from the detector 51, FIG. 6, i.e. a series of pulses representative of spots passing the detector conditioned by the detector circuitry for input to microcontroller 120, is an input, indicated as 127, to input/output interface 123. The pulses are transmitted to microcontroller 120 which counts the pulses and thereby keeps track of the position of the film. This provides feedback to the microcontroller of operation of stepper motor 44 so that stepper motor 44 can be controlled to move from one selected image to another selected image. It should be noted that upon initial start up of the projector unit, or upon reset of the unit, the film will be moved to the start of the reel so that the microcontroller has a reference to begin its count.

When microcontroller 120 receives information that a ball has been hit and the distance and hook or slice information, microcontroller 120 determines the operation of the iris and rotations of the control mirrors necessary to project a light spot providing a relatively accurate representation of the ball travel on the golf course image being projected on the screen. The signals to control operation of lower control mirror 90 through operation of stepper motor 92 are provided from microcontroller 120 to stepper motor controller 130, while the signals to control operation of upper control mirror 94 through operation of stepper motor 96 are provided from microcontroller 120 to stepper motor controller 131. Both stepper motor 92 and stepper motor 96 are preferably of a hybrid type having step angles of 1.8 degrees, although other types of stepper motors with larger step angles of 7 degrees could be used, or motors with smaller step angles could be used. This type of stepper motor has four phase or stator windings or coils i, ī, j, and j̄, indicated for motor 92 as phase windings or coils 132, 133, 134, and 135, respectively. The windings are energized by grounding respective leads i, ī, j, or j̄, respectively, to connect a positive twelve volt supply voltage to ground through the respective phase coil. By controlling the energization of each of the phase coils, rotation of the stepper motor is controlled.

It should be noted that while the windings are referred to and shown as windings i, ī, j, and j̄, each of these represent a plurality of windings with the pair of windings i and ī forming a set of windings associated with a set of stator teeth and the pair of windings j and j̄ forming a set of windings associated with another, generally alternating, set of stator teeth. Each pair of windings provides for opposite polarity energization of the associated stator teeth. Thus, current flowing through windings i will provide positive energization to its associated teeth while the same current flowing through windings ī will provide negative energization of the associated stator teeth. Windings i and ī, or j and j̄, should never be energized simultaneously. In some stepper motors, rather than the pairs of windings i and ī and j and j̄, single windings are provided. The same operation of the stepper motor is provided by reversing the flow of current through such windings. Thus, in the following description, if two sets of single windings are used, the notations i and ī would indicate positive and negative current flow through one set of single windings, while the notations j and j̄ would indicate positive and negative current flow through the other set of single windings.

In normal one-phase operation of a stepper motor, winding i would be energized to move the rotor to one position, then winding j would be energized to move the rotor to the next position, then winding ī would be energized to move the rotor to the next position, and then winding j̄ would be energized to move the rotor to the next position. To continue rotation, winding i would then again be energized to move the rotor to the next position, followed by again energizing windings j, ī, and j̄, and continuing the pattern to continue rotation. As can be seen, four distinct stages of energization of the coils take place which are called the four quadrants of the stepper motor operation or rotation. The stepper motor rotor rotates through one step for each quadrant of operation or for four steps for all four quadrants of operation. Holding any of the windings energized will hold the rotor in that position, and reversing order of energization will reverse direction of the rotor. By controlling energization of the windings, the rotor is moved by steps and caused to rotate, stop, and reverse, as desired.

In normal two-phase operation of a stepper motor, two adjacent windings are energized simultaneously. Thus, windings i and j are energized, then windings j and ī, then windings ī and j̄, and then windings j̄ and i. This cycle is repeated to continue rotation of the rotor. This mode of operation is the most commonly used because it reduces oscillation of the motor. A combination of single coil energization followed by two adjoining coil energization, followed by single coil, followed by two coil, etc., for example energization of i, followed by i and j, followed by j, followed by j and ī, etc., is also sometimes used and is known as a one-two-phase excitation mode of operation. This breaks each step of rotation of the rotor from previous excitation modes down into half steps. Each of these modes of operation also operates through four quadrants. These modes of operation are described in a booklet entitled "Technical Information on Stepping Motors" put out by Oriental Motor Company, Torrance, Calif. and Tokyo, Japan, describing their Vexta ™ motors. It should be realized that both coils i and ī or j and j̄ should never be energized simultaneously.

Applicants have found that rather than energizing one coil and then the next coil, a pair of coils and then the next pair, or even one coil and then a pair, and then one, etc., as described above for standard modes of stepper motor operation, that the motor steps can be broken down into a desired number of microsteps by varying the relative length of time each adjacent coil is energized, and by energizing the i and ī and the j and j̄ inversely.

For example, by driving one motor phase with thirty percent power and the other motor phase with seventy percent power, the rotor will be positioned within its normal step angle approximately thirty percent or seventy percent of the way through that angle of rotation depending upon which side the angle is measured from. By dividing the percent power applied to the respective phases into a large number of steps, the normal step angle is divided into approximately the same number of intermediate steps.

Figure 10:
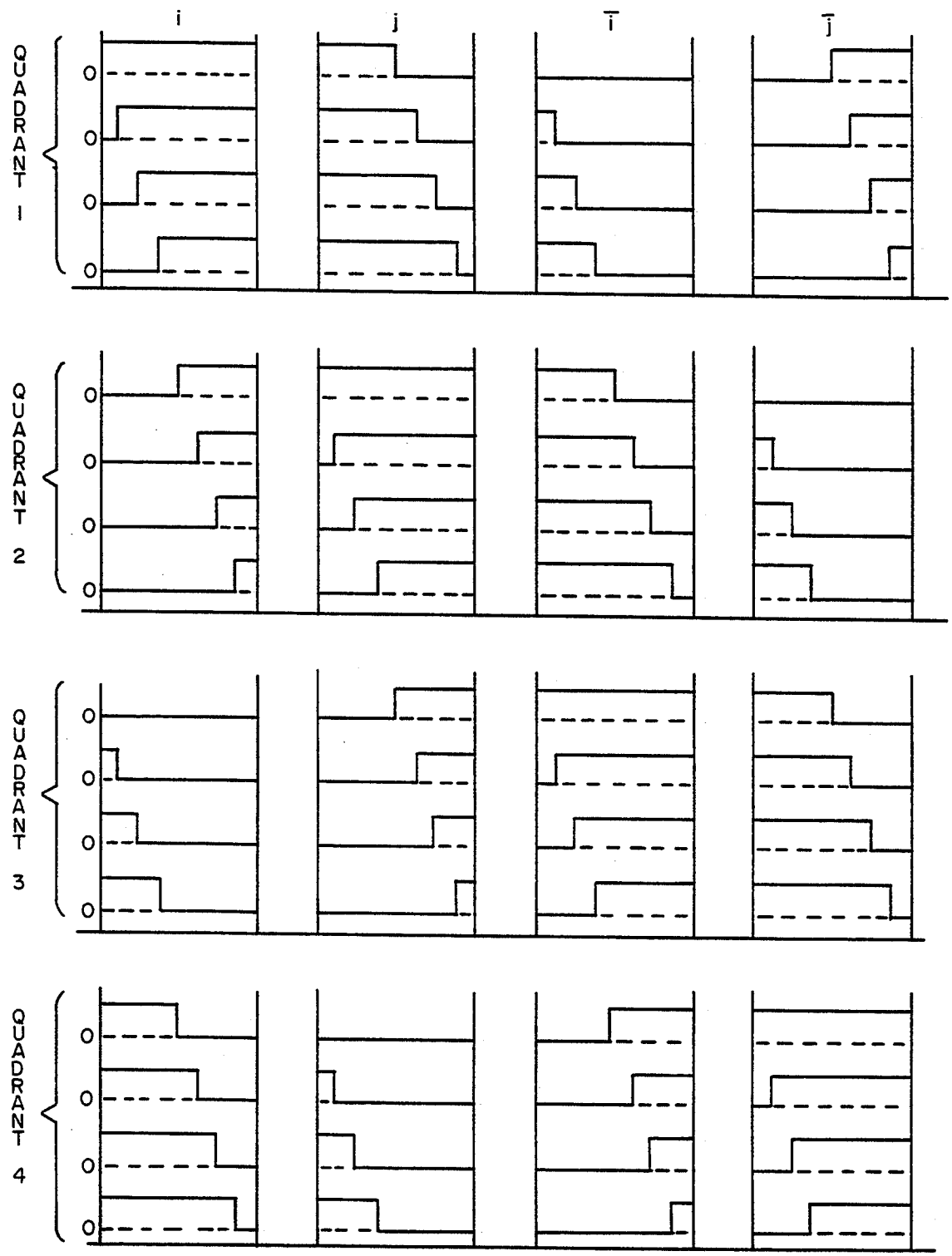

In FIG. 10, representative waveforms for each quadrant of stepper motor operation is shown. In quadrant 1, under normal single phase operation, winding i is energized while the remaining windings are not energized. With standard two phase operation, windings i and j are both energized simultaneously. With the present invention, the quadrant is broken down into a large number of varying energization or micro-steps depending upon the desired position or rotation of the motor rotor within that step. Thus, for rotation of the rotor, the quadrant would start for its first micro position with winding i energized for the full time with no energization of ī. Winding j is energized one-half the time as is j̄ for the remaining half time to average a zero j. The energization of i and ī, and of j and j̄ are the inverse of one another. When i is energized, ī is not energized, and visa versa. Thus, at any time either i or ī is energized. Similarly, when j is energized, j̄ is not energized and visa versa. Thus, at any time either j or j̄ is energized. As the signals progress through the first quadrant, i is energized for a progressively lesser time and j is energized and for a progressively longer time until the beginning of quadrant two is reached at which time i is energized for half the time, ī for the other half to average 0 energization of the i windings and j is energized for the full time. The progression through the second quadrant continues to the beginning of quadrant three wherein i is completely unenergized, ī is fully energized, and j and j̄ are each energized for half the time. The progression continues through the third quadrant to quadrant four wherein j is unenergized, j̄ is fully energized and i and ī are each energized half of the time. The progression then continues to the start of quadrant one again. FIG. 10 shows four steps in each progression through each quadrant for purposes of illustration to show how the progression proceeds. However, the signals are preferably broken down into many more steps and the actual progression followed for any movement of the stepper motors will be controlled by the control circuitry and will depend on the speed of movement desired between several stepper motor positions and the final position desired for the stepper motor. Thus, where rapid rotation is desired for movement between two points, the stepper motor may be supplied with, for example, twenty or thirty progressive waveforms in a quadrant, where if slower movements or a small degree of movement around a position is desired, very small changes in the waveform can be provided. The number of intermediate waveforms that can be provided can vary as desired, but it has been found preferable to provide for at least 512 possible variations or microsteps in each quadrant, and preferably 1024 microsteps for each quadrant. This allows very fine positioning and very fine and smooth movement between positions.

Figure 11:
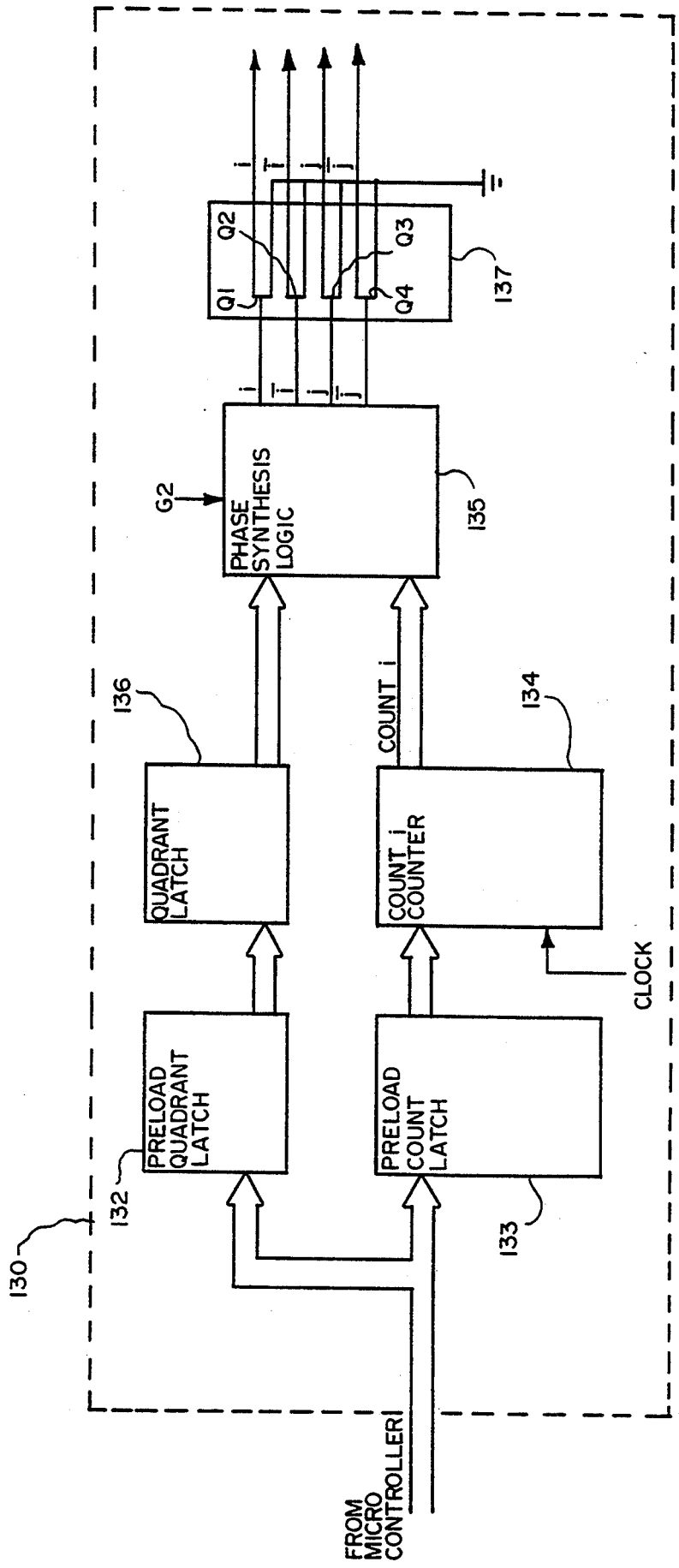

FIG. 11 shows a more detailed block diagram of the stepper motor controller 130 which controls the movement of stepper motor 92. The circuitry of stepper motor controller 131 which controls stepper motor 96 is identical. The instructions from microcontroller 120 instruct the stepper motor controller where to position the mirror. These instructions tell the motor controller the signals to supply to the coils of the stepper motor by giving the controller a quadrant (indicative of a step) and position within a quadrant (indicative of position within a step). Thus, the signals from the microcontroller set the desired quadrant, one to four, into the preload quadrant latch 132 and the desired position within the quadrant, i.e. which of the 512 or 1024 micropositions within the quadrant is desired, into the preload count latch 133. It should be noted that the system as shown in FIG. 9 includes a clock, such as an internal part of microcontroller 120, which generates clock pulses to control operation of all system components. Also, means to generate a second system timing or synchronization pulse, here indicated as a $G_2$ pulse, is provided. This may be a separate counter to count the clock pulses to provide a $G_2$ pulse for every predetermined number of clock pulses counted, or the counter may be programmed into the microcontroller to produce the $G_2$ pulse for every predetermined number of clock pulses. If each step is broken down into 1024 microsteps, the $G_2$ pulse is set to change state each 1024 clock pulses. Thus $G_2$ is high for 1024 clock pulses and then low for 1024 clock pulses.

With the current invention, the signals to control the stepper motors are generated as combinations of the $G_2$ pulses and a signal called "count i" which is a signal which is high during a preset number of clock pulses. The "count i" signal is generated by the count i counter 134. The count i counter 134 provides a counting means for counting clock pulses and the "count i" signal produced is a count signal pulse of length equal to a setable number of clock pulses. The "count i" signal is determined by the information set into the preload count latch 133 by microcontroller 120 which tells the counter how many clock signals to count. The preload count latch 133 provides a count set means under control of the microcontroller which sets the number of clock pulses to be counted by the counting means. For example, if 1024 micro steps are used, i.e. 1024 clock pulses are counted between each change of state of $G_2$, and it is desired to position the stepper motor at micro step 200, count i counter 134 is set to count 200 clock pulses and thereby produce a "count i" signal which is high during the first 200 clock pulses after each change of state of the $G_2$ pulse. The "count i" signal is sent from the count i counter 134 to the phase synthesis logic 135. The phase synthesis logic 135 provides a combining means for combining the "count i" signal and the synchronizing pulse, $G_2$. The phase synthesis logic 135 is set by a signal from the quadrant latch 136 to combine the "count i" and $G_2$ signals in one of four different ways to produce the correct i, j, $\bar{i}$, $\bar{j}$ signals for the desired quadrant and position in the quadrant. To provide the i, j, $\bar{i}$, and $\bar{j}$ signals, different logic must be used for each quadrant. The microcontroller sets the preload quadrant latch 132 to the desired quadrant. This, in turn, sets the information into the quadrant latch 136 which tells the Phase Synthesis Logic 135 which logic to use to generate particular motor control signals. Thus, the preload quadrant latch 132 and the quadrant latch 136 provide a means under control of the microcontroller 120 for setting the logic or the way signals will be combined in the phase synthesis logic 135. As described, microcontroller 120 controls and coordinates operation of the count set means and the combining means to thereby control and coordinate operation of the stepper motor.

The i and j signals for each quadrant are given by the following logic equations:

$$\text{Quadrant 1} \quad i = \overline{\text{count i} + G_2}$$

$$\text{Quadrant 1} \quad j = G_2 + \text{count i}$$

$$\text{Quadrant 2} \quad i = \overline{G_2} \cdot \overline{\text{count i}}$$

$$\text{Quadrant 2} \quad j = \overline{G_2} + \text{count i}$$

$$\text{Quadrant 3} \quad i = G_2 \cdot \text{count i}$$

$$\text{Quadrant 3} \quad j = \overline{G_2} \cdot \overline{\text{count i}}$$

$$\text{Quadrant 4} \quad i = G_2 + \text{count i}$$

$$\text{Quadrant 4} \quad j = G_2 \cdot \text{count i}$$

The $\bar{i}$ and $\bar{j}$ signals are merely the inverse of the i and j signals respectively.

As indicated above, the signal from the quadrant latch 136 indicates to the phase synthesis logic which logic equation to use in generating the i, j, $\bar{i}$, and $\bar{j}$ signals. These signals are the control signals for the stepper motor and are sent to the motor drivers 137 shown as four MOSFETS $Q_1$, $Q_2$, $Q_3$, and $Q_4$ in block 137. As shown, when a signal is supplied to a MOSFET, that MOSFET connects the respective winding of the stepper motor to ground. Thus, if a high signal appears on the output i of the phase synthesis logic 135, the high signal is applied to MOSFET $Q_1$ causing it to turn on and ground winding i of the motor. This energizes the winding of the motor as previously described. Similarly, high signals on outputs $\bar{i}$, j or $\bar{j}$ would cause MOSFET $Q_2$, $Q_3$, or $Q_4$ to turn on to ground the appropriate ⓘ, j or ⓙ windings. With no signal on a line, the MOSFET is open and the winding is not energized.

As is apparent from the above description, all signals to control stepper motor operation are generated by a combination of the $G_2$ signal with the "count i" signal provided by a single counter in the stepper motor controller 130. This is a very effective way to generate the motor control signals.

The stepper motor controller 131 which controls stepper motor 96 is identical to stepper motor controller 130 and, again, requires a single counter in the controller to produce the signals required to control stepper motor 96. The clock signals and $G_2$ signal used are common signals supplied to each of stepper motor controllers 130 and 131.

In control of the stepper motors, upon initial start up of the system or reset of the system, each of the mirrors, as controlled by stepper motors 92 and 96, will be set to their limit or reference positions and then moved to the desired positions from there. To determine the limit or reference positions, as previously described, limit switches 98 and 99 are provided. As shown in FIG. 9, the closing of either of these switches grounds an input to control I/O interface 123. This provides a signal to microcontroller 120 telling it that the motor is at its limit or reference position. In causing movement of the motor from that position, microcontroller 120 keeps track of all movement it instructs the motor to go through and thus keeps track of the motor position at any time.

Since the microstepping of the stepper motors under the control as described above is not linear over the various steps, in order to improve the accuracy of operation and positioning of the motors, it is preferable to create and provide tables for each of the motors to be controlled using microsteps that correlate actual motor position with each of the microstep indications. This can be done by applying each microstep signal to a motor and measuring the actual movement and position of the motor rotor with an encoder coupled to the motor shaft. For example, it may be that to move a motor half way through a step, normally requiring a "count i" of 512 counts if a total step of 1024 counts is used, only 480 steps are required. Thus, the actual position versus the step position is determined. These measurements for each motor may be stored in memory such as in a separate memory provided for that purpose. The memory may be provided in the form of an erasable programmable read only memory (EPROM). In this way, a look-up or correlation table may be custom provided for each stepper motor and plugged into the circuitry that uses that motor. For example, an EPROM 142 containing a position look-up or correlation table for motor 92, and an EPROM 143 containing a position look-up a correlation table for motor 96 may be included in the circuitry. In such instance, when microcontroller 120 receives an instruction to move motor 92 to a certain position to provide the light spot indicating the golf ball at a certain position on the screen, microcontroller 120 looks up the desired position in EPROM 142, obtains the microstep position corresponding to the desired position, and then sends instructions to stepper motor controller 130 to set the position of motor 92. If the stepper motor is changed, the EPROM 142 can also be changed.

With the micro stepping of the present invention, a ball spot can be repeatedly positioned within about an inch on a nine foot by twelve foot screen, wherein the repeatability of the prior art was within about six inches. Further, using the look up linearity or correlation tables, the position is repeatable within about one-half inch.

Stepper motor controller 140 controls operation of stepper motor 98 which operates the iris. Operation of stepper motor 98 is not as critical from the standpoint of microsteps as is operation of the two mirror motors so motor 98 may be operated in a more traditional fashion such as with standard two phase control. The limits of movement of the iris are indicated by switches 105 and 106 which, upon operation, provide a ground signal to control I/O interface 123, which, in turn, provides a signal to microcontroller 120.

The operation of the stepper motor 219 which controls the movement of lens holder 210 for providing automatic focus is also noncritical and can be operated in normal two phase manner.

The invention also contemplates the method of providing and using a look-up or correlation table for stepper motors operated in microstep mode so that the nonlinearities of the stepper motors may be compensated for and the accuracy and repeatability of positioning such motors is improved.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. As part of a system for simulating a game of golf wherein a scene of a golf course looking from the position of a ball toward a green is projected onto a screen and the ball is hit by a player toward the screen, apparatus for projecting selected images of a scene representing a scene of a golf course looking toward the green onto a screen and for projecting and moving a spot of light on the screen superimposed on the scene representing a golf ball moving in the scene after being hit by a golfer, comprising:

a housing;

a projector adapted to project selected individual frames of a film strip mounted in the projector, said projector including a focusing lens;

means for moving the focusing lens to automatically focus the scene on the screen;

means associated with the projector for generating an infrared probe beam directed at an angle to the portion of the film being projected so that the probe beam will reflect from the film, the position of the reflected probe beam being indicative of the film position;

detector means for detecting the position of the reflected probe beam thereby determining if the film is in an "in-focus" position and if not, which direction the lens must move to provide an "in-focus" position, said detector means providing output signals indicative of the needed movement;

means for modulating the probe beam;

means for demodulating the detector output;

control means responsive to the detector output for causing operation of the means for moving the lens to maintain the focus of the scene;

sport projecting means secured in the housing in predetermined position with respect to the scene projecting means and adapted to project a light spot onto the screen superimposed on the scene and to move the light spot within the scene; and means for controlling operation of the scene projecting means and spot projecting means in response to instruction signals received from outside the apparatus.

2. Apparatus according to claim 1, wherein the means for controlling operation of the scene projecting means and the spot projecting means in response to instruction signals received from outside the apparatus includes a microprocessor dedicated to the apparatus and physically located with the apparatus.

3. Apparatus according to claim 2, wherein the instruction signals received from outside the apparatus are digital signals received in serial fashion via a communication line.

4. Apparatus according to claim 3, wherein the instruction signals indicate the scene to be projected and indicate the position and movement of the light spot on the screen, and wherein the means for controlling operation of the scene projecting means and the spot projecting means causes operation of such means to project the indicated scene and move and position the light spot in the indicated manner.

5. Apparatus according to claim 4, wherein the scene projecting means is a projector adapted to project selected individual frames of a film strip mounted in the projector and includes a focusing lens and means for moving the focusing lens to automatically focus the scene on the screen.

6. Apparatus according to claim 1, wherein the means for moving the lens includes track means; a lens holder for securely holding the lens and mounted for sliding movement on the track means; means for biasing the lens holder in a direction of travel along the track means; cam means; cam follower means mounted on the lens holder and extending into contact with the cam whereby movement of the cam against the cam follower causes movement of the lens holder along the track means; and motor means responsive to the control means for rotating the cam to move and maintain the lens in "in-focus" position.

7. Apparatus according to claim 6, wherein means are provided to limit the amount of rotation of the cam.

8. Apparatus according to claim 6, wherein the motor means is a stepper motor.

9. Apparatus according to claim 1, wherein the probe beam is modulated at a frequency of about 700 Hz.

10. As part of a system for simulating a game of golf wherein a scene of a golf course looking from the position of a ball toward a green is projected onto a screen and the ball is hit by a player toward the screen, apparatus for projecting selected images of a scene representing a scene of a golf course looking toward the green on a screen and for projecting and moving a spot of light on the screen superimposed on the scene representing a golf ball moving in the scene after being hit by a golfer, comprising:

scene projecting means;

means for generating a light beam;

first rotatable mirror means for directing the light beam in a first plane and for adjusting the direction of the light beam in said first plane;

second rotatable mirror means for directing the light beam in a second plane and onto the screen to form a light spot on the screen in superposition on the scene and for adjusting the direction of the light beam in said second plane, said first and second planes representing perpendicular directions of movement in said scene so that the light spot may be selectively positioned and moved between selected positions on the screen;

first stepper motor means having a rotor for controlling movement and position of said first mirror means in response to first control signals;

second stepper motor means having a rotor for controlling movement and position of said second mirror means in response to second control signals;

clock means for generating clock pulses;

synchronizing pulse means for generating synchronizing pulses each synchronizing pulse and the time therebetween being of a length equal to a predetermined number of clock pulses;

first counting means for counting clock pulses and producing a first count signal pulse of length equal to a setable number of clock pulses;

first count set means for periodically setting the number of clock pulses to be counted by the first counting means, the number of clock pulses set indicating the desired position of the first stepper motor rotor within an associated step;

first combining means for combining in one of several preset ways the first count signal pulse and the synchronizing pulse to produce said first control signals, the way such first count signal pulse and the synchronizing pulse are combined indicating the associated step position for the rotor of the first stepper motor, said first control signals indicating the desired operation of the first stepper motor;

second counting means for counting clock pulses and producing a second count signal pulse of length equal to a setable number of clock pulses;

second count set means for periodically setting the number of clock pulses to be counted by the second counting means, the number of clock pulses set indicating the desired position of the second stepper motor rotor within an associated step;

second combining means for combining in one of several preset ways the second count signal pulse and the synchronizing pulse to produce said second control signals, the way such second count signal pulse and the synchronizing pulse are combined indicating the associated step position for the rotor of the second stepper motor, said second control signals indicating the desired operation of the second stepper motor; and control means for controlling and coordinating operation of the clock means, first and second count set means, and first and second combining means to thereby control and coordinate operation of the first and second stepper motors.

11. Apparatus according to claim 10, wherein each stepper motor has four quadrants of operation, and each combining means includes four different ways in which the count signal pluses and the synchronizing pulses may be combined, each way being associated with a specific quadrant of operation of a motor.

12. Apparatus according to claim 10, wherein the control means keeps track of the position of a mirror by keeping track of all movement of the mirror from a reference position, and wherein an electrical switch is provided associated with each rotatable mirror which changes state upon rotation of the mirror in one direction to the predetermined reference position, the change in state of such switch indicating to the control means that the mirror is at its reference position.

13. Apparatus according to claim 12, including means for adjusting the electrical switch to thereby adjust the reference position as desired.

14. Apparatus according to claim 10, wherein the relationship between successive control signals and successive positions of a particular stepper motor rotor is not linear, and wherein the apparatus includes a correlation memory, a table of correlations relating control signals to actual positions of the particular stepper motor rotor is stored in the memory, and the control means consults the table of correlations in determining the control signals needed to move the particular stepper motor rotor to desired positions.

15. Apparatus according to claim 14, wherein the correlation memory is a plug-in memory.

16. Apparatus according to claim 15, wherein the correlation memory is a memory chip.

17. Apparatus according to claim 16, wherein separate memory chips are provided for the first and second stepper motors.

18. Apparatus according to claim 17, wherein each memory chip is an erasable programmable read only memory (EPROM) chip.

* * * * *